Jan. 27, 1931.　　G. GORTON ET AL　　1,790,581
ENGRAVING AND OTHER MACHINE
Filed Dec. 24, 1926　　6 Sheets-Sheet 1

Jan. 27, 1931.  G. GORTON ET AL  1,790,581
ENGRAVING AND OTHER MACHINE
Filed Dec. 24, 1926  6 Sheets-Sheet 2

Jan. 27, 1931. G. GORTON ET AL 1,790,581
ENGRAVING AND OTHER MACHINE
Filed Dec. 24, 1926 6 Sheets-Sheet 3

Inventors
George Gorton
and
George Gorton III
by Hubert E Vick
Attorney.

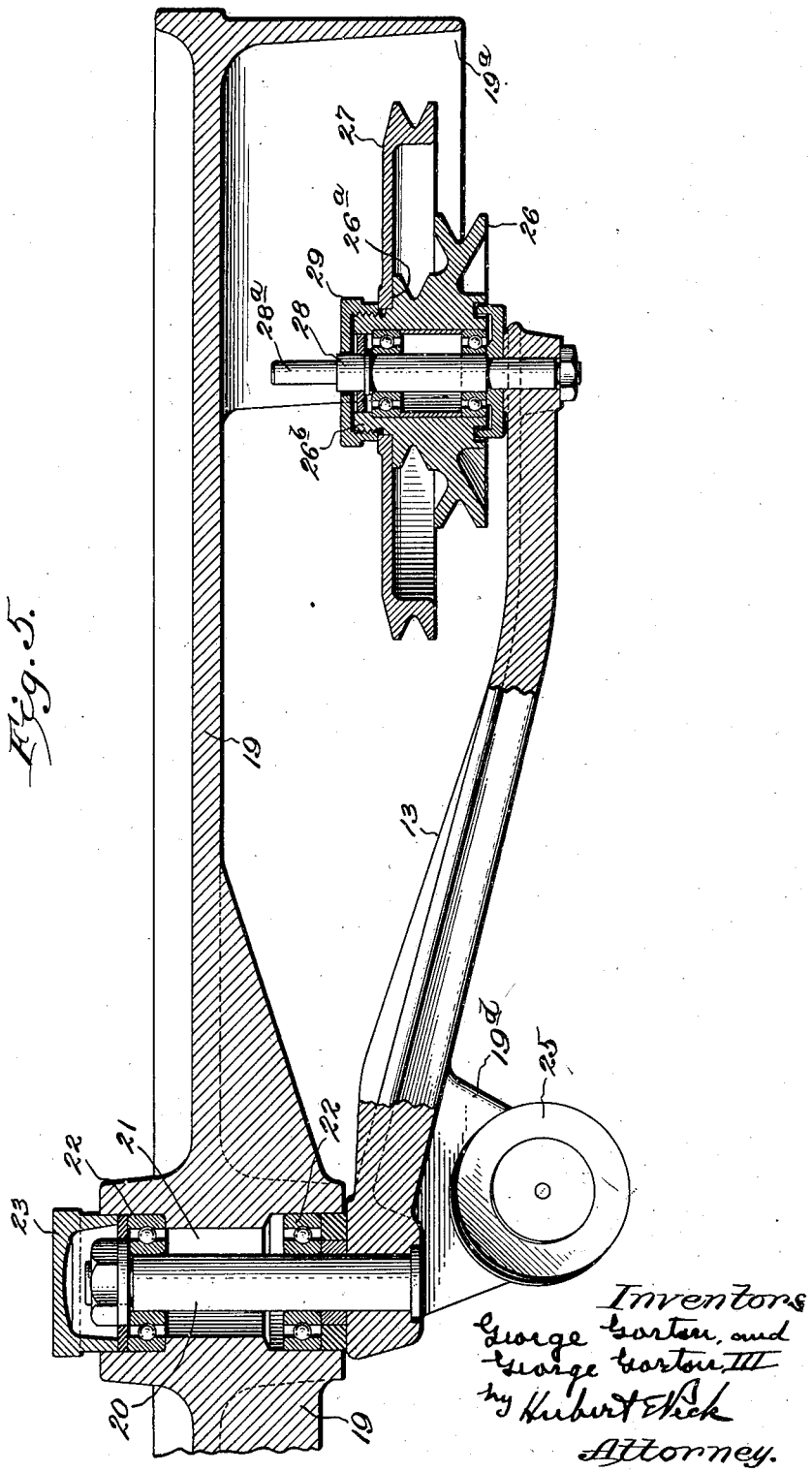

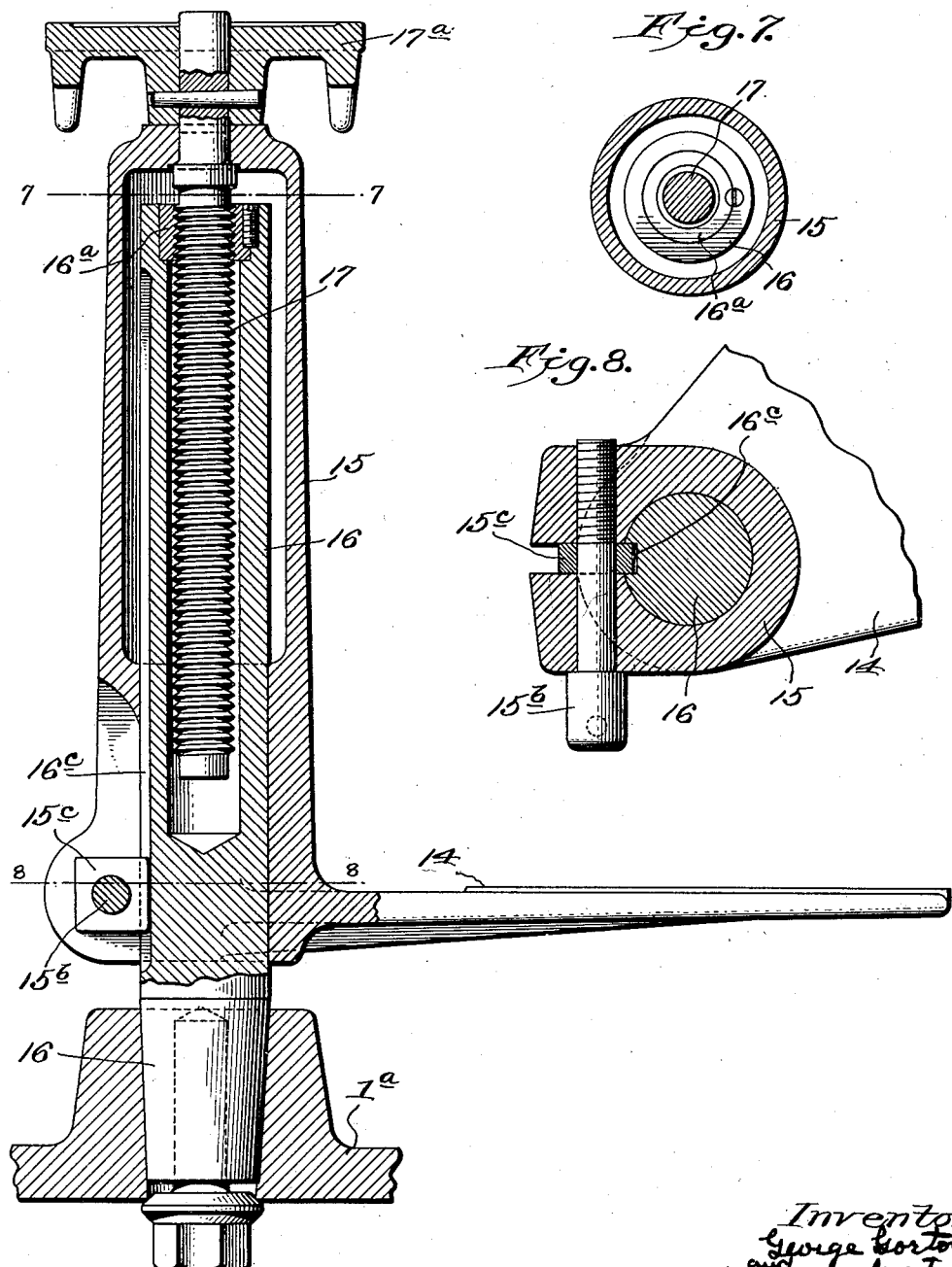

Jan. 27, 1931.  G. GORTON ET AL  1,790,581
ENGRAVING AND OTHER MACHINE
Filed Dec. 24, 1926    6 Sheets-Sheet 6
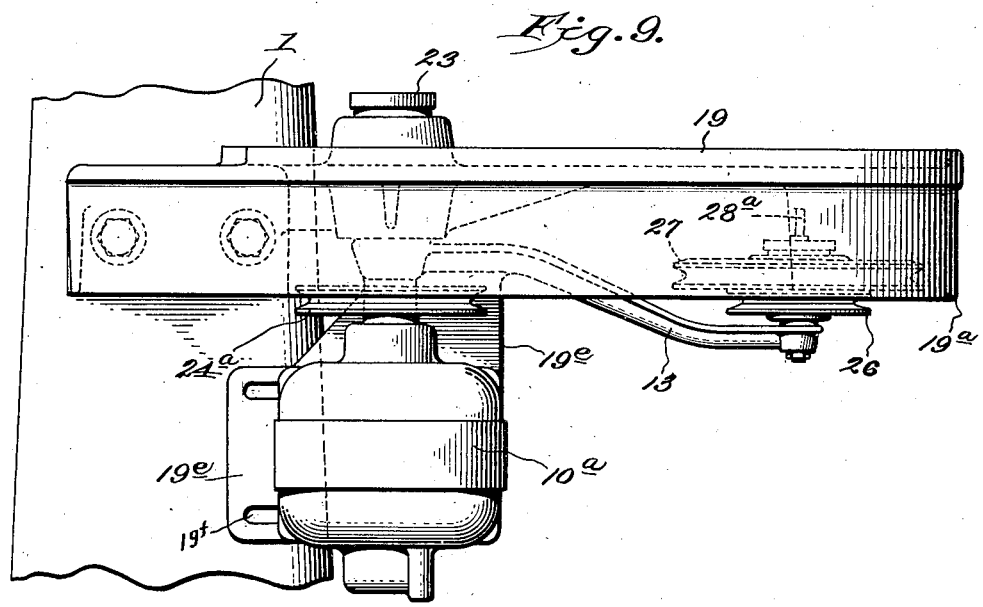
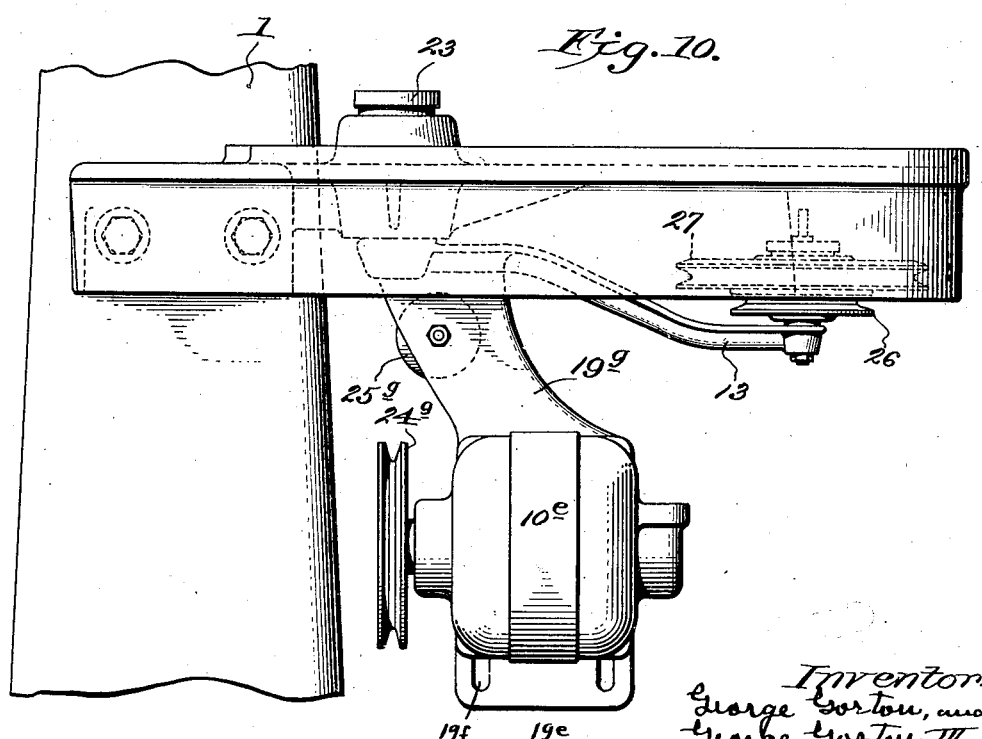

Patented Jan. 27, 1931

1,790,581

UNITED STATES PATENT OFFICE

GEORGE GORTON AND GEORGE GORTON, 3D, OF CEMENT, OKLAHOMA

ENGRAVING AND OTHER MACHINE

Application filed December 24, 1926. Serial No. 156,818.

This invention particularly relates to so-called engraving machines, and by the term "engraving machines" we include routing, milling, die sinking and other machines that embody a belt driven cutter head or the like carrying or controlling a rotary cutting tool movable laterally along or over the work to perform its cutting operations thereon, and controlled in its lateral movements by so-called copy or a pattern through the medium of a stylus or the like and any suitable pantograph or other movement transmitting mechanism, whereby the movement of the stylus or the like in following the copy is transmitted to the rotary cutter, to cause the cutter to duplicate the copy on or in the work in scaled or other relation.

In many of these machines, the stylus is moved by hand in following the copy or pattern and the rotary cutter is consequently correspondingly moved laterally over the work through the movement transmitting mechanism, and it is highly desirable throughout these movements, to maintain a uniform driving relation of the belt drive on or with respect to the cutter, and to avoid variations in the tension of the belt on the cutter and also to avoid pull of the belt on the cutter tending to laterally shift the cutter position or resist lateral movement of the cutter, in other words, it is desirable for the cutter while being driven by the belt drive, to remain accurately set, at any position to which it has been laterally shifted by the pantograph, even though the operator's hands have been removed from the pantograph and stylus, and to be freely movable laterally while being driven by the belt drive, free of varying or other resistance or restraining stresses by the belt drive due to the lateral movement and changing positions of the driven cutter.

The objects and nature of our invention will be readily understood by those skilled in the art in the light of the following explanations of the accompanying drawings that illustrate what we now believe to be the preferred mechanical expression or embodiments of the invention from among other forms, construction and arrangements within the spirit and scope thereof.

Particularly, it is an object of the invention to provide an improved engraving machine by reason of the provision of a belt drive that meets the conditions herein before pointed out, and that is comparatively simple, compact, and durable in structure and efficient in action.

A further object of the invention is to provide certain belt drive improvements of peculiar advantage and utility in engraving machines when utilized to actuate the rotary cutters thereof.

With the foregoing and other objects in view, our invention consists in certain novel features in structure, and in combinations and arrangements as more fully and particularly set forth and specified hereinafter.

Referring to the accompanying drawings forming a part hereof:—

Fig. 5 is a detail vertical section on an enlarged scale, the endless belts not being shown.

Fig. 6 is a detail vertical section.

Fig. 7 is a detail section on the line 7—7, Fig. 6.

Fig. 8 is a cross section on the line 8—8, Fig. 6.

Fig. 9 is a detail elevation showing a modification.

Fig. 10 is a detail elevation showing another modification.

Figure 1:
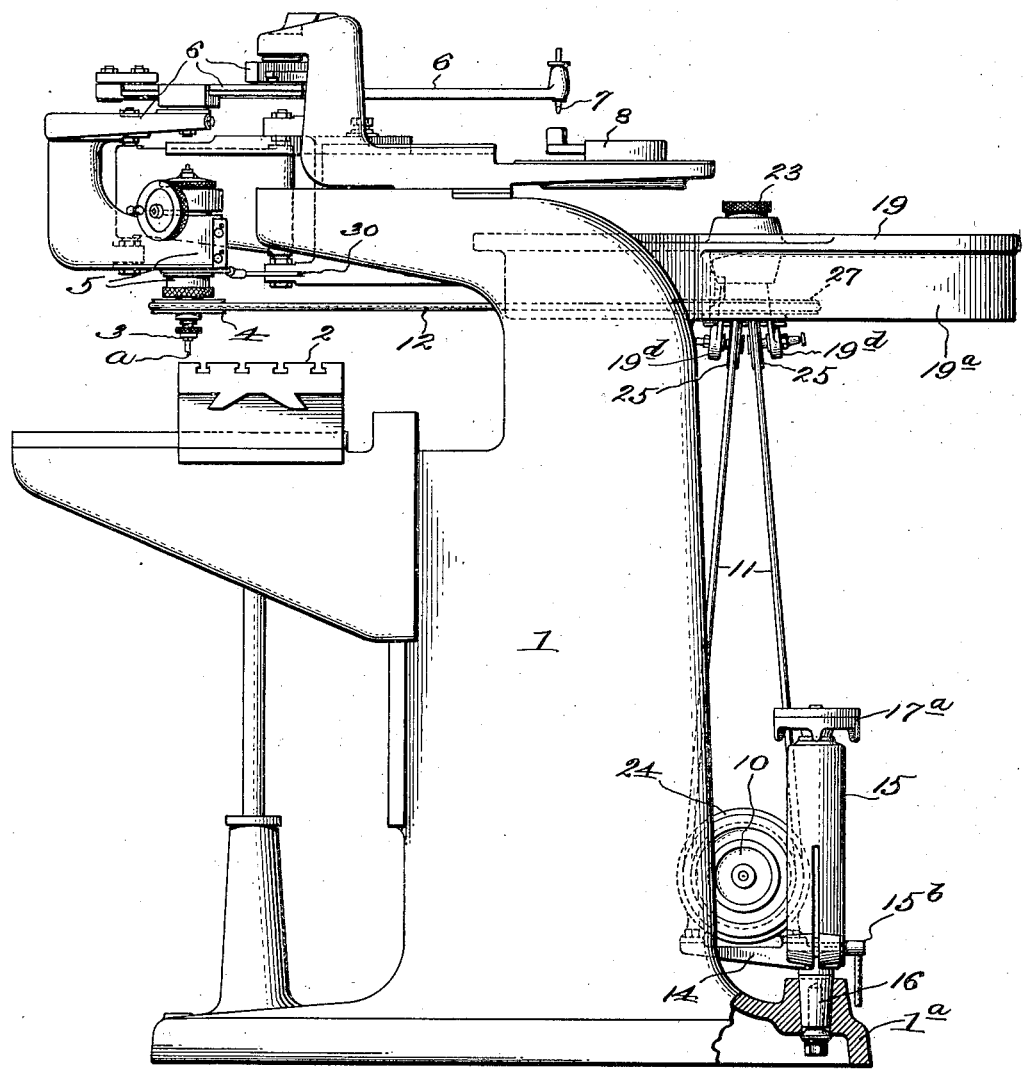
Fig. 1 is an elevation of an engraving machine that embodies our invention from the side faced by the operator, the column base being partially broken away, certain hidden parts being shown by dotted lines.
Figure 2:
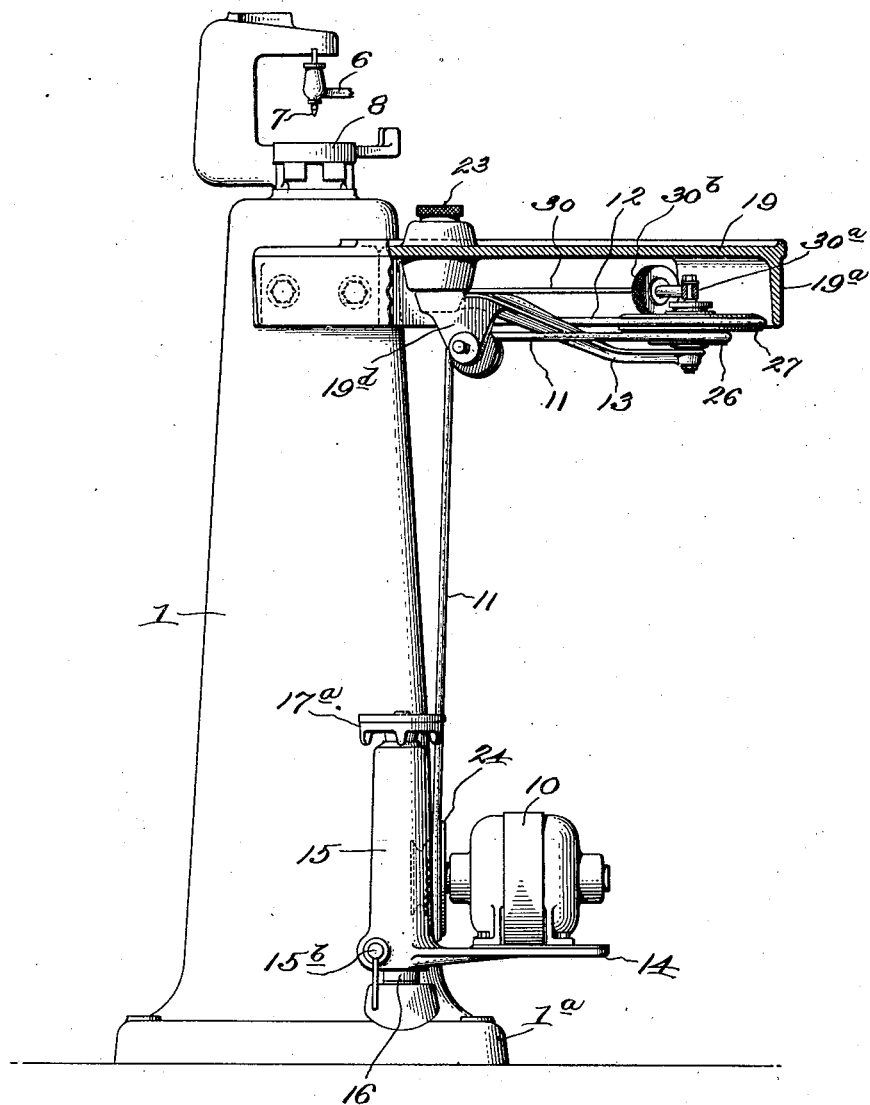
Fig. 2 is a rear elevation of the engraving machine, the operator's stand or position being at the left of this view, a part being shown in vertical section, the pantograph mechanism not being shown in full.

In the drawings, we show an engraving, die sinking, routing or milling machine of the pantograph controlled type, having a pedestal or main frame that embodies column 1, having base 1a.

The column carries a knee or other support for work table 2, on which the work (not shown) is clamped or otherwise secured in such manner that the surface of the work to be operated on by the vertical rotary cutting tool a, is located below said tool and the cutter head carrying the same.

The tool a, is carried by and extends down from a rotary vertical driven cutter spindle 3, having cutter driving belt pulley 4, fixed thereto.

This spindle 3, is mounted in and carried by the cutter head 5, which forms a part of, or is controlled in its horizontal or lateral movements over the work by, any suitable pantograph 6, or equivalent movement transmitting mechanism. This pantograph is supported in any suitable manner on or by the column, and is controlled in its movements by and embodies a stylus 7, arranged over any suitable support 8, carried by the column, for the copy or pattern (not shown).

As is well understood by those skilled in the art, the copy or pattern to be reproduced in scaled or other relation in or on the work by the rotary cutting tool, is clamped or otherwise secured on the copy support 8, and the operator grasping the pantograph by hand adjacent to the stylus, thereby laterally moves the stylus to follow the copy and the pantograph transmits such movements to the cutter head, and the rotary cutter is thereby correspondingly shifted or moved horizontally or laterally over the work as may be required to reproduce in or on the work the design, lettering or other configuration of the copy.

The problem is to constantly rotate the cutting tool at a uniform speed during a reproduction operation, by a simple compact belt drive that maintains its uniform driving relation on or with respect to the cutter pulley, without belt pull, during the lateral operative movements of the rotary cutter and while said cutter is in any operative position to which it may be moved or shifted by the pantograph.

Figs. 1–8— disclose one of our solutions of this problem. In this solution, we support the motor 10, for driving the rotary cutter, at the lower portion of the column, at the rear of the opposite side of the base or column from the operator's position, and transmit the rotary motion of the motor to the cutter driving pulley through the medium of two endless belts 11, 12, and suitable driving, driven and idler pulleys certain of which pulleys are carried by the free end portion of a horizontally swingable compensating arm 13.

The motor 10, is mounted on and secured to a motor support or base 14, in the form of a horizontal shelf or platform carried by, rigid with, and projecting laterally from a vertical hub or sleeve 15, surrounding and arranged longitudinally of and supported by a fixed vertical pin or stud shaft 16, secured to and rising from the rear portion or corner of the base 1a, and spaced from the column 1.

In the example shown, the sleeve 15 is adjustable vertically on the shaft 16, to raise and lower the shelf 14, and the motor 10, to suit conditions of each installation, and particularly to vertically shift the motor 10 whenever necessary to tighten the belt 11 or maintain the same under the desired tension.

The sleeve 15, is supported in vertical adjustment through the medium of a vertical rotary longitudinal screw 17, depending within the sleeve from the closed upper end of the sleeve wherein the screw is journaled to rotate but held against substantial relative longitudinal movement. The upper journal end of the screw extends through the closed end of the sleeve in which it is rotatable and at its upper end above the sleeve is provided with a wheel or handle 17a, by which the screw can be rotated.

The fixed shaft 16, is longitudinally hollow to receive the screw 17, and a fixed nut 16a, meshing with the screw is secured in the upper end of shaft 16. The sleeve 15, and its load will hence be raised and lowered by rotation of the screw in the desired direction. The lower end of the sleeve 15, is longitudinally split and provided with clamping screw 15b, whereby the sleeve can be compressed on and thereby locked to shaft 16, and can be released for vertical adjustment.

The screw 15b, is shown carrying a tenon 15c, fitting and vertically slidable in longitudinal groove 16c, in shaft 16, to hold the sleeve 15 against rotation on shaft 16.

The hood-like sleeve 15, encloses the shaft 16, and the sliding surfaces and screw threaded adjusting means, protecting the same against injury, dirt and other foreign matter, and permitting the presence and retention of grease or other lubricant within the shaft and sleeve.

Figure 3:
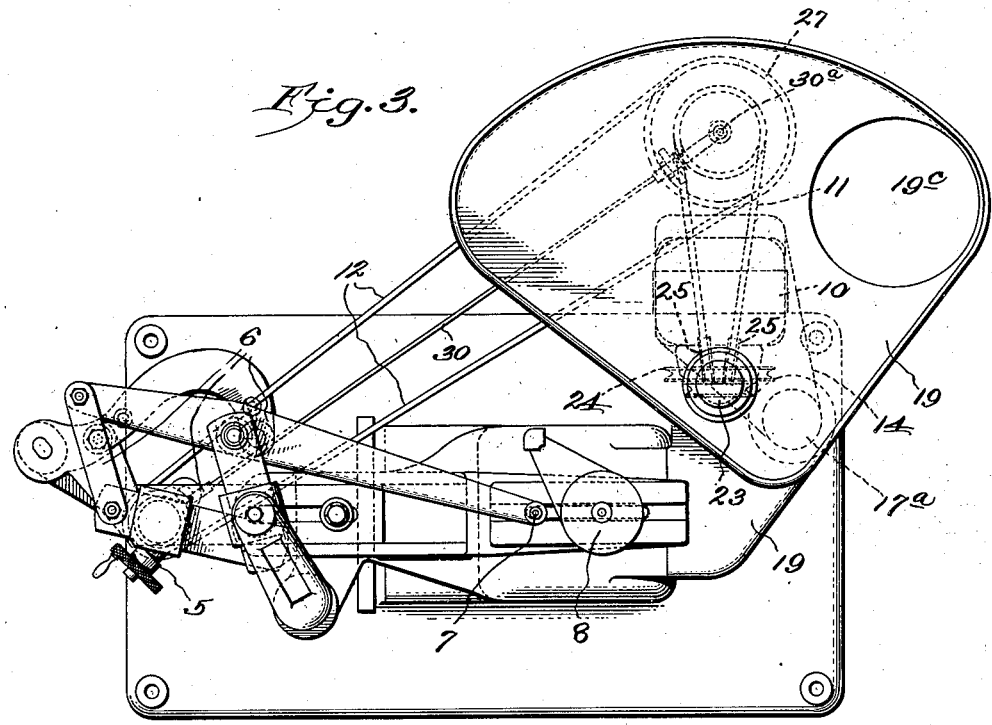
Fig. 3 shows the engraving machine in top plan, certain hidden parts being shown by dotted lines.
Figure 4:
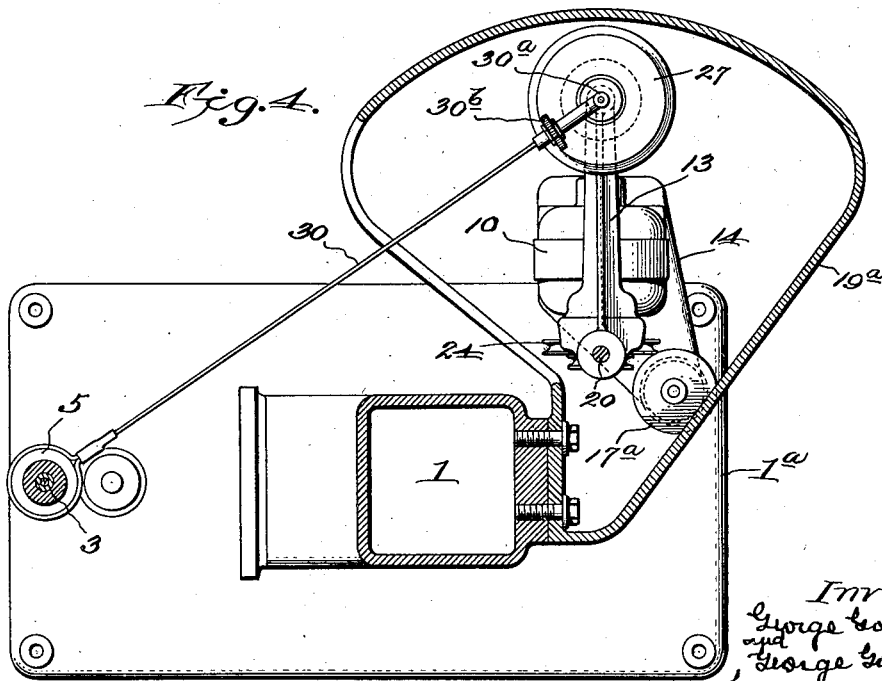
Fig. 4 shows the machine in horizontal section.

The operator stands in front of the side of the machine shown by Fig. 1, and in front of the lower side of the machine as it appears in the top plans of Figs. 3 and 4, so that, in this example, the motor 10, is located on the other side of the machine from the operator's stand and at the back part thereof.

We, hence, provide a support at said other side of the machine and beyond the top or upper part of the column and preferably directly above the motor, for the horizontally swinging compensating arm 13.

For this purpose, in the particular example shown, we provide a fixed bracket 19, rigid with the upper part or end of the column 1, and extending horizontally from the rear of said column in a direction away from the operator's side of the machine. In other words, this fixed support 19, projects laterally from the column and rearwardly over the base with respect to the operator's stand. While we show this supporting bracket 19, as a separately formed member, fixedly secured to the upper end of the column, yet we do not so wish to limit our invention. In the example shown, this supporting bracket is in the form of a strong rigid horizontal plate or shelf 19, of enlarged top area formed with a depending edge flange or apron 19a, all located at approximately the same horizontal level as the rotary cutter spindle, yet we do not wish to so limit all features of our invention.

The compensating arm 13, is horizontally disposed and is hung from, arranged under and protected by this bracket 19. For instance, this arm, at its forward end with respect to the operator's stand, is supported by and is fulcrumed to swing on other than a horizontal axis, and the arm extends rearwardly from its fulcrum end in a direction away from the operator's side of the machine.

For instance, the arm can be suspended by or hung from the bracket 19, to swing horizontally on an axis formed by an elongated vertical stud shaft or pin 20, rigid with and upstanding from the forward end of the arm and extending upwardly into and mounted to rotate in any suitable bearings in the forward part of the bracket 19. This shaft 20, is supported in the bracket to freely rotate and uphold the arm and its load, against objectionable vertical play or movement and sagging. While we do not wish to so limit our invention, this result can be accomplished by forming a vertical bore 21 of enlarged diameter through the bracket, and vertically upholding and supporting the shaft 20 therein by several spaced sets of end-thrust resisting ball bearings 22. The bore 21, is closed at the lower end, while the upper end thereof is normally closed by a removable plug or cap 23, so that the bore forms a lubricant or grease well in which the ball bearings are arranged and accessible to the lubricant in the well.

The horizontal shaft of motor 10, located down near the base of the machine, is equipped with a belt driving pulley 24 located approximately directly below so as to be approximately intersected by the straight continuation of the vertical axis 20, on which the compensating arm 13 swings horizontally.

The arm 13, carries a pair of angularly arranged idler pulleys 25, below the under side of its fulcrumed or forward end.

At its rear or free end, the arm 13, is equipped with a normally fixed upstanding elongated vertical shaft or spindle 28, on which are mounted above the arm, a driven belt pinion or pulley 26, and a concentric driving belt pulley 27, normally fixed to, parallel with and driven by the pulley 26.

In the particular example shown, the pulley 26 is formed with an elongated hub 26b, the upper end of which is reduced and threaded to removably enter the center or hub opening of the pulley 27, and to provide an annular seat 26a, against which the pulley 27 is normally rigidly clamped by cap forming nut 29, removably screwed on the upper end of the hub 26b.

The bore of the hub of pulley 26 is enlarged to form a grease or lubricant well normally closed at the top by cap 29, and suitably closed at the bottom to retain grease. The pulleys are preferably mounted on the shaft 28, through the medium of ball bearings located within said grease well.

The pulley 26, is preferably of the stepped type, i. e. including several belt pulleys or steps of different diameters, to provide for speed change by shifting the belt from one to the other, and the motor pulley 24 is also preferably of the stepped type for change speed purposes.

The pulley 27 is removable as hereinbefore described, so that it can be removed and reversed, or for substitution of another pulley of different diameter.

To facilitate removal and application of the pulley 27, the shelf or tray-like bracket 19, is formed with a vertical opening or handhole 19c, normally closed by a removable lid or cover, through which the cap 29, and pulley 27, are readily accessible, when the arm 13 is swung to bring its free end below said opening. The end 28a, of the shaft 28, is projected upwardly above the pulley 27, and cap 29, to form a free end projecting vertical pin for the removable attachment of means, such as push and pull rod 30, for connecting the cutter head 5 and free end of arm 13, to swing together and thereby maintain the desired relative positioning and relation between these parts during the operative lateral movements of the rotary cutter over the work being operated on.

In the example shown, this push and pull rod 30, is formed at one end with a ring or eye more or less loosely surrounding and confined to the cutter head 5, or the bearing housing for the rotary cutter spindle. The opposite end of said connection 30, is formed with an eye 30ª, or ring loosely surrounding the projecting pin 28a, at the free end of arm 13, and capable of being lifted therefrom and dropped thereonto. This arrangement that provides connection 30, with end eye 30a, and the free end of arm 13 with the upstanding stud or pin 28a, permits the operator to easily lift the connection 30 and free eye 30a from stud 28a so that belt 12 can be lifted from pulley 27 for removal and renewal. The eye 30a can be as easily dropped on to the stud to establish the tension connection after belt 12 has been restored to operative position on the pulleys 4, and 27.

The push and pull connection 30, also preferably embodies sections united by a screw threaded coupling operated by finger wheel or nut 30b, to vary the length of the connection 30, and to serve as a belt tightener for belt 12.

The endless belt 11, extends vertically from the motor pulley 24, which drives the same, to the idler pulleys 25, one for each belt ply or length, and from said idlers, the belt 11, extends rearwardly and horizontally, below the bracket 19, and straddling the arm 13, to the pulley 26, which is driven thereby.

The endless belt 12, fitting and driven by the pulley 27, extends horizontally therefrom under the bracket 19, to and fits and drives the rotary cutter spindle pulley 4. The horizontal belt 12, is located at the far or rear side of the machine from the operator's stand, and extends at an angle forwardly and toward the left (Fig. 3) from the free end of arm 13. As the arm 13, swings laterally with the cutter head as said head moves laterally over the work, because of the relative position maintaining connection 30, the belt 12, maintains a uniform driving relation on the rotary cutter spindle without objectionable belt pull on the cutting mechanism, providing there is no objectionable belt pull on the arm 13 from belt 11.

The two idler pulleys 25, are spaced apart and are preferably mounted on separate shafts carried by spaced separate rigid ears 19d, depending from the fulcrumed end of arm 13, so that said idlers are suspended from the arm immediately below the vertical axis or fulcrum 20. These idler pulleys are relatively inclined so as to converge forwardly to separately receive at their front peripheral portions the upwardly converging lengths or plies of the belt 11, from the motor pulley, and bring the upper parts of the vertical portions of said length or plies as close together, without contacting, as practicable, and maintain said vertical lengths approximately in vertical alinement with the longitudinal axis of the fulcrum 20, on which the arm 13 swings.

The idler pulleys 25, change the direction of the lengths of belt 11, from the vertical to the horizontal, and the horizontal lengths of said belt diverge as they extend from the tops of the idler pulley peripheries to the pulley 26.

The idler pulleys 25, are so arranged with respect to the vertical axis 20, on which arm 13, carrying said pulleys, swings, as to maintain the vertical portions of belt 11 that depend from the front edges of the pulleys, in alinement with or in approximate longitudinal continuation of the longitudinal axis of pivot or fulcrum 20, whereby the horizontal portions of the belt 11 from the idler pulleys to pulley 26, will extend so nearly as possible from said axis to said pulley 26, to thereby in effect swing with the arm 13, from the same axis as the arm, and thereby avoid shortening or lengthening of the horizontal portion of the belt and hence avoid belt pull. As the idler pulleys are carried by the pivoted end of the arm 13 approximately in line with the axis on which the arm swings, lateral movement of the idler pulleys as the arm swings is reduced to the minimum, and twisting tendency of the vertical lengths of the belt is also reduced to the minimum and is not sufficient to objectionably vary the belt tension. The area of the shelf-like rigid bracket 19, is preferably sufficient to enable the bracket to cover and guard the arm 13, belts, and parts carried, thereby throughout its full range of movement.

This bracket 19, is so formed, preferably, as to constitute a convenient shelf or tray for the reception of tools, small work, copy, oil cans and the like.

In Fig. 9, we show a modification, wherein the motor 10a, for actuating the friction belt drive for the cutter spindle, is supported by the belt drive compensating arm 13, and is hung or suspended from the front or fulcrumed end of said arm through the medium of hanger or bracket 19e, rigid with and depending from said arm, to which bracket the motor is clamped or otherwise secured in normal operative fixed relation.

In this instance, the motor is shown vertically arranged with a vertical rotary motor shaft to the upper end of which is normally fixed the motor drive pulley 24a, in approximately the same horizontal plane as the pulley 26, at the free or rear end of compensating arm 13. The motor pulley 24a, drives the pulley 26, through the medium of an endless horizontal friction belt (not shown in Fig. 9) that in this modification takes the place and performs the functions of belt 11, of Fig. 1.

To maintain the driving belt from pulley 24a, to pulley 26, under the desired tension, the motor 10a, is preferably horizontally adjustable in a direction longitudinally of arm 13. For instance, the clamping bolts (not shown) securing the motor 10a, to the bracket or ear 19e, can extend through one or more slots 19f, in bracket 19e, to permit this adjustment.

In the drawings, the axis of pulley 24a, is approximately alined with the arm axis 20, which is a convenient and desirable arrangement, as we prefer to locate the load (weight) of the motor at the fulcrumed end of arm 13, where the range of movement of the arm, during the swing thereof, is approximately nil. As the belt from pulley 24a, to pulley 26, and its drive, are carried by the arm 13, the operative relation of said belt with respect to pulley 26, and said arm remains constant during the swing of the arm, and belt pull tending to swing, or to resist swing of the arm does not occur, and the same remarks apply to the arrangement of Fig. 10, hereafter described.

In the modification shown by Fig. 10, the motor 10e, is arranged in a horizontal position under the pivoted end of arm 13, from which it is hung and supported by hanger 19g, providing for vertical adjustment of the motor for belt tightening purposes, as described hereinbefore.

The motor pulley 24g, is vertically arranged with respect to idlers 25g, to receive a belt such as 11, of Figs. 1–5, but of much shorter length. The idlers 25g, and the belt to drive pulley 26, and the belt drive will be otherwise arranged as hereinbefore described, for driving as shown in Figs. 1, 2, 3, 4, 5, 6, the motor being hung from the fulcrumed end of the compensating arm 13, instead of independently supported as in Fig. 1.

The motor 10e' being carried by and hung from the pivoted end of arm 13, the tendency of the motor weight to render the arm sluggish in movement and to cause overthrow, is reduced to the minimum, and this fact is also true of the arrangement of Fig. 9.

It will be noted that in the various disclosures, driving belt pulleys are not centered on and carried by the pivot on which the compensating arm 13 swings, and that the arm and pulley arrangements are such that endless driving belts can be used and that these belts are readily detachable from their pulleys for renewing without removing of parts or dismantling of the machine with the exception that to remove and renew belt 12 merely requires lifting the tension rod 30 to free its end eye from the upstanding stud 28a.

It will also be noted that the shelf 19 that forms a normally fixed part of the machine frame or column 1 and extends horizontally and rearwardly therefrom, cooperates with the compensating arm and with the driving belts to guard and protect the same and to prevent injury to operators through contact with said belts.

It will also be noted that the pivoted end of the horizontally swingable compensating arm 13, carries at its pivoted end a belt support (whether idler pulleys 25 or 25g or the driving pulley 24a), and that this belt support is arranged vertically opposite, i. e. in this instance below the pivot 20 of the arm 13 and is vertically spaced therefrom and that important advantage is thereby gained, as hereinbefore explained.

It is evident that various changes, modifications, and variations might be resorted to without departing from the spirit and scope of our invention and hence we do not wish to limit ourselves to the approximate disclosures hereof.

What we claim is:

1. In an engraving machine, in combination; a supporting frame including a column having a base; a work support accessible from the front or operator's side of the machine; a cutter head including a rotary cutter spindle; a cutter head support extending laterally from said column whereby said cutter head is movable laterally over the work on said work support; a manually-actuated pantograph mechanism carried by said column whereby said cutter head is moved laterally over the work, said pantograph mechanism accessible from said operator's side of the machine and including a tracer for following the copy; and a drive carried by said frame for actuating said cutter spindle; said drive including a compensating arm arranged at the rear side of said machine with respect to said front or operator's side and projecting rearwardly from said column and supported and swingable laterally from its front end on a vertical axis and carrying belt pulleys, a motor support below said axis, a tension rod arranged at said rear side of the machine and extending laterally from the rear end of said compensating arm to said cutter head to operatively connect said head and said arm to swing together, and an endless belt drive to extend from the motor on said motor support over said pulleys and outwardly longitudinally of said arm and laterally at the rear of the machine from the rear end of said compensating arm to said cutter spindle to drive the same.

2. In an engraving machine, in combination; a supporting frame; a cutter head carried thereby to move laterally over the work and provided with a rotary cutter spindle; manually actuated pantograph mechanism including a tracer, for moving the cutter head laterally in reproducing the pattern on the work; a laterally-swingable compensating arm having a free end and at its opposite end pivotally supported from said frame on a vertical pivot; a tension rod operatively connecting the free end of said arm with said head to maintain the operative relation between said head and the free end of the arm; a primary driving pulley vertically spaced from said pivot and approximately located in the vertical axial line thereof; and an endless belt drive including an endless belt driven by and extending vertically from said pulley in approximate longitudinal vertical alinement with the axial line of said pivot, to the pivoted end of said arm and therefrom longitudinally and outwardly of said arm to the free end thereof, and another endless belt driven by said first mentioned belt and extending laterally from the free end of said arm to said spindle for driving the same, said arm being provided with pulleys for said belt drive.

3. An engraving machine of the pantograph type having its cutter head movable laterally over the work and provided with a rotary cutter spindle, said machine embodying a belt drive compensating arm the free end of which is operatively connected to said cutter head to cause the head and arm to move together as the head moves laterally over the work; said arm being pivotally supported from its opposite end to swing on a vertical axis; and an endless belt drive for said cutter spindle extending vertically, in approximate longitudinal alinement with the axial line on which said arm swings, to the pivoted end of the arm and therefrom outwardly of the arm to the free end of the arm and laterally therefrom to the cutter spindle to drive the same, said arm being provided at its free end with driving and driven belt pulleys and at its pivoted end with a pair of idler belt pulleys, said pivoted end of the arm provided with a pair of lateral relatively fixedly-located inclined shafts for said idler pulleys holding said idler pulleys in inclined positions converging toward the portions of their peripheries that receive said vertical portion of the belt drive.

4. An engraving machine of the pantograph type having its cutter head movable laterally over the work and provided with a rotary cutter spindle, said machine embodying a belt drive compensating arm the free end of which is operatively connected to said cutter head to cause the head and arm to move together as the head moves laterally over the work; said arm being pivotally supported from its opposite end to swing on a vertical axis; and an endless belt drive for said cutter spindle including an endless belt extending vertically, in approximate longitudinal alinement with the axial line on which said arm swings, to the pivoted end of the arm and therefrom outwardly of the arm to the free end of the arm, and another endless belt extending laterally from the free end of said arm to the cutter spindle to drive the same, said arm being provided at both its pivoted and free ends with pulleys for said belt drive.

5. An engraving machine of the pantograph type having its cutter head movable laterally over the work and provided with a rotary cutter spindle, said machine embodying a belt drive compensating arm the free end of which is operatively connected to said cutter head to cause the head and arm to move together as the head moves laterally over the work; said arm being pivotally supported from its opposite end to swing on a vertical axis; and an endless belt drive for said cutter spindle extending vertically, in approximate longitudinal alinement with the axial line on which said arm swings, to the pivoted end of the arm and therefrom outwardly of the arm to the free end of the arm and laterally therefrom to the cutter spindle to drive the same, said arm being provided at both its pivoted and free ends with pulleys for said belt drive, the pulleys at the pivoted end of said arm including a pair of spaced complementary idler pulleys arranged at the under side of the arm directly below the pivot and mounted on axes having fixed locations on and laterally arranged with respect to said arm.

6. In an engraving machine and the like, in combination; a cutter head movable laterally over the work and provided with a belt driven rotary cutter spindle; a laterally movable tracer; operative mechanism between the tracer and head whereby the head is moved laterally in scaled relation by the tracer; a free end compensating arm swingable laterally on a pivot parallel with said spindle and at its free end carrying an axis parallel with said pivot, said axis provided with driven and driving pulleys exposed for removal and application of endless belts; an endless driving belt from said driving pulley to and for driving said cutter spindle; a tension connection for swinging the arm with the head and for maintaining the belt tension, said connection being detachable for removal and application of said belt; a driving belt support arranged at and carried by the pivoted end of said arm and spaced and separate from said pivot, whereby the lateral movement of said support with the arm is reduced to the minimum; an endless driving belt extending from said belt support outwardly longitudinally of said arm to and for driving said driven pulley on said axis, and a driving motor for said last mentioned belt.

7. In combination, in engraving machines and the like; a cutter head movable laterally over the work and including a belt pulley driven rotary cutter spindle; a compensating arm swingable horizontally on a pivot parallel with said spindle and at its free end provided with a shaft parallel with said pivot and having a free end; driven and driving pulleys on said shaft; an endless driving belt extending laterally from the driving pulley to said spindle for driving the same and removable therefrom; a tension rod between said arm and said head to maintain the relative arrangement between the head and arm as the head moves laterally over the work, said arm having an end eye on and vertically removable from and applicable to said shaft free end to permit removal and application of said belt; and a driven endless driving belt carried by said arm and extending outwardly thereof to and for driving said driven pulley.

8. In an engraving machine and the like, in combination; a cutter head provided with a laterally movable carrier whereby the head is movable laterally over the work and provided with a vertical rotary cutter spindle; a supporting frame having a fixed lateral portion providing a vertical bore; a compensating arm having a fixed upstanding vertical pivot shaft entering said bore and thrust bearings upholding said shaft therein whereby the arm is hung therefrom to swing on a vertical axis; the free end of said arm provided with a pulley rotatable on a vertical axis; an endless belt driven by said pulley and extending laterally from said arm to and for driving said spindle; another endless driving belt extending outwardly of said arm to the free end thereof to drive said pulley; and an adjustable tension rod connection between said head and the free end of said arm whereby the head and arm swing laterally together.

9. In an engraving machine and the like having a cutter head carrying the rotary cutter spindle with the rotary cutter spindle driven by an endless belt drive from a motor; in combination, the machine supporting frame; a vertically adjustable support for the belt driving motor; an upstanding post fixed to said frame and provided with a stationary nut; a non-rotary sleeve carrying said support and exteriorly receiving and slidable vertically on said post; and vertical screw means meshing with said nut and rotatable with respect to said sleeve to raise and lower and support the sleeve and motor.

10. In an engraving machine and the like of the type having a supporting column with the cutter head carrying the rotary cutter spindle movable laterally over the work and controlled in its movement by pantograph mechanism accessible to the operator from the front side of the machine and with the rotary cutter spindle driven by a drive that includes a laterally swingable belt drive compensating arm at the rear of said column; a horizontal tray-forming shelf fixedly secured to and projecting rearwardly from said column and exposed and accessible from above and located above and guarding said arm throughout its operative swing.

Signed at Racine, Racine County, Wisconsin, this 15th day of Dec., 1926.

GEORGE GORTON.
GEO. GORTON, III.